US006771380B1

(12) United States Patent
Kim

(10) Patent No.: US 6,771,380 B1
(45) Date of Patent: Aug. 3, 2004

(54) METHOD FOR IMPROVING A PRINTING SPEED OF A PRINTER

(75) Inventor: Sung-Jae Kim, Kyonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/223,711

(22) Filed: Dec. 31, 1998

(30) Foreign Application Priority Data

Dec. 31, 1997 (KR) ........................................... 97-79875

(51) Int. Cl.[7] .......................... G06F 15/00; B41J 29/38; G03G 15/20; H05B 1/00

(52) U.S. Cl. .................... 358/1.15; 358/1.17; 358/1.15; 347/17; 347/19; 399/69; 399/70; 219/216

(58) Field of Search ................................ 358/1.12, 1.1, 358/1.13, 1.2, 1.15, 1.17, 1.18; 347/17–40; 399/69, 70, 9; 219/216

(56) References Cited

U.S. PATENT DOCUMENTS 5,588,092 A * 12/1996 Komiya et al. ............ 395/109
5,647,056 A * 7/1997 Barrett et al. ............ 395/200.1
5,652,660 A * 7/1997 Seto et al. .................. 358/300
5,655,174 A * 8/1997 Hirst .......................... 399/27
5,768,654 A * 6/1998 Noguchi et al. .............. 399/69
5,848,347 A * 12/1998 Kuo et al. .................. 399/406
5,940,653 A * 8/1999 Maekawa et al. .............. 399/9
6,031,624 A * 2/2000 Murphy ..................... 358/1.17
6,067,100 A * 5/2000 Otsuka et al. ................ 347/17

* cited by examiner

*Primary Examiner*—Kimberly Williams
*Assistant Examiner*—Saeid Ebrahimi
(74) *Attorney, Agent, or Firm*—Robert E. Bushnell, Esq.

(57) ABSTRACT

Disclosed is a method for improving a printing speed of a printer. According to the present invention, a method for improving a printing speed of a printer comprises the steps of: converting data to be printed by a predetermined size; calculating a time required for transferring the converted data to the printer by means of a predetermined calculating formula; setting a starting time for transferring a command of recognizing an environment of a printer engine to the printer with reference to the calculated time; transferring the command of recognizing the environment of the printer engine to the printer at the starting time during a transferring of the converted data; and performing the recognizing of the environment of the printer engine after receiving the command of recognizing the environment.

18 Claims, 3 Drawing Sheets

METHOD FOR IMPROVING A PRINTING SPEED OF A PRINTER

CLAIM OF PRIORITY

This application makes reference to, incorporates the same herein, and claims all benefits accruing under 35 U.S.C. §119 arising from an application for a *A Method For Improving a Printing Speed of a Printer* earlier filed in the Korean Industrial Property Office on Dec. 31, 1997 and there duly assigned Ser. No. 79875/1997.

FIELD OF THE INVENTION

The present invention relates to a method for printing data, and more particularly to a method for improving a printing speed of a printer, in which the printer is made to be driven as fast as data to be printed are transferred at a desired speed so as to perform a recognizing of a printing environment.

DESCRIPTION OF THE PRIOR ART

Recently, users makes use of a host computer under a multimedia environment. A document which is made by the users includes graphic data and an information of HTML formation to be complicated. Therefore, a new printer has been required for printing such document fast.

SUMMARY OF THE INVENTION

It is an object of the present invention to provide a method for improving a printing speed of a printer, in which a host computer calculates a data transfer speed and transfers a command of recognizing an environment of a printer engine to prevent a time delay of printing data.

To accomplish the above object of the present invention, there is provided a method for improving a printing speed of a printer comprising the steps of:

converting data to be printed by a predetermined size;

calculating a time required for transferring the converted data to the printer by means of a predetermined calculating formula;

setting a starting time for transferring a command of recognizing an environment of a printer engine to the printer with reference to the calculated consumption;

transferring the command of recognizing the environment of the printer engine to the printer at the starting time during a transferring of the converted data; and performing the recognizing of the environment of the printer engine after receiving the command of recognizing the environment.

The time required for transferring the converted data is calculated as follows:

the transfer time=a size of a page of data/a transfer speed

The data to be printed are converted by a page.

BRIEF DESCRIPTION OF THE DRAWINGS

A more complete appreciation of the invention, and many of the attendant advantages thereof, will readily apparent as the same becomes better understood by reference to the following detailed description when considered in conjunction with the accompanying drawings in which like reference symbols represent the same or similar components, wherein.

DETAILED DESCRIPTION OF THE INVENTION

Figure 1:
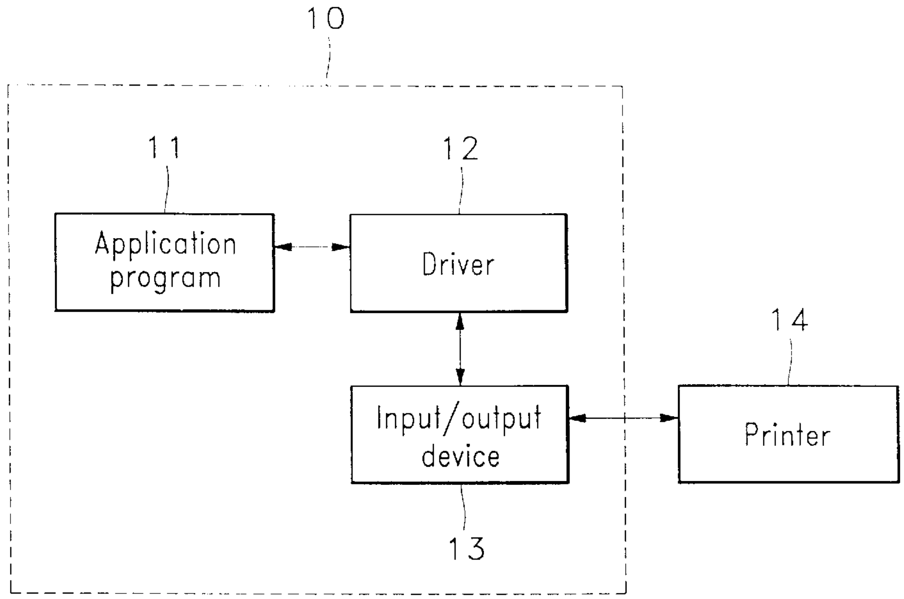
FIG. 1 is a block diagram showing a printing environment according to the earlier art.

FIG. 1 is a block diagram showing a printing system according to the earlier art. As shown in FIG. 1, the printing system includes an application program 11, a driver 12 for converting data to be printed into commands according to a request of the application program, an input/output device 13 for transferring the converted data to a printer 14, the printer 14 which is connected to the input/output device for interpreting and printing the converted data page by page.

Figure 2:
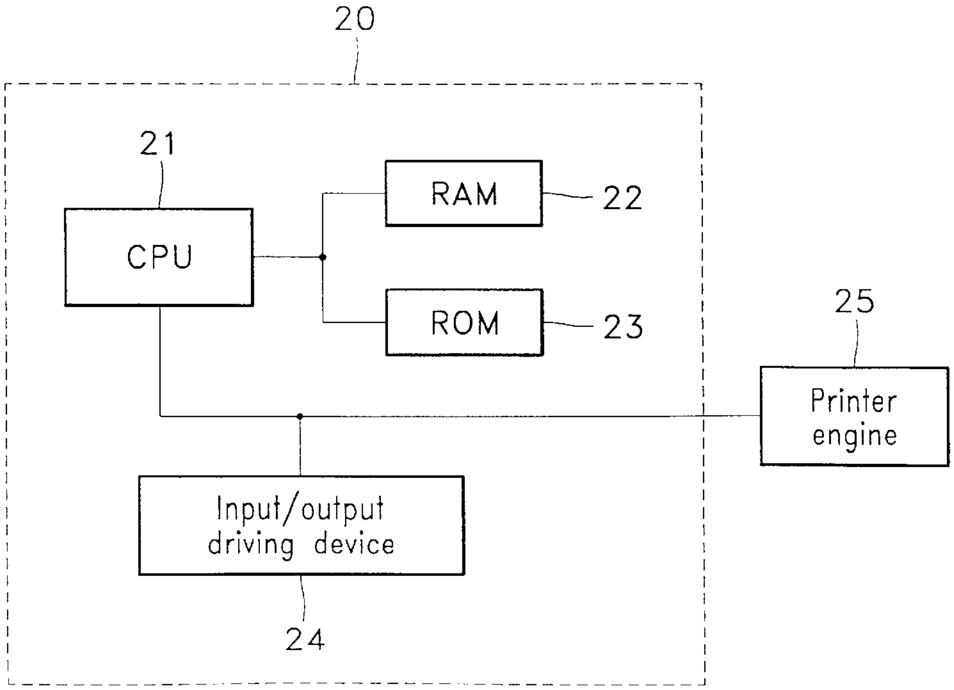
FIG. 2 is a block diagram showing elements of a laser printer according to the earlier art.

FIG. 2 is a block diagram showing elements of a laser printer according to the earlier art. The laser printer includes a controller 20 for interpreting the data transferred from the host computer 10 and for generating a printing signal and a printer engine 25 for performing the printing of the data according to the control of the controller 20. The controller 20 includes a CPU 21, a RAM 22, a ROM 23, and an input/output device 24.

Hereinafter, an operation of the laser printer according to the conventional art will be described. The host computer 10 including a personal computer converts document data which a user writes using the application program 11 into commands which the printer 14 can interpret by means of the printer driver 12. Then, the host computer 10 transfers the data to be printed to the printer 14 through the input/output device and a serial or parallel port. The printer 14 interprets and converts a page of the received data into the data in a bitmap which the printer engine 25 can recognize, which in turn applies a printing signal to the printer engine 25.

The printer engine 25 recognizes the present printing environment to print the data under an optimal condition. Then, a developing temperature of a developing device is determined according to conditions of the printing environment, for example a temperature and a humidity. A rated voltage is applied to the developing device so that a toner on the developing device is fixed to a paper. The printer 14 warms up the printer engine 25 to recognize the optimal environment and then performs the printing of the data. That is, the printer engine 25 needs to be warmed up.

Accordingly, since the printer engine is warmed up before the printing of the data in order to recognize the printing environment, a starting time for printing of the data is delayed according to the recognizing of the environment of the printer engine 25. As a result, the printing speed of the printer 14 is degraded below the substantial printing speed of the printer engine 25. Furthermore, every time when the printer 14 prints a plurality of pages of data a page by page, the printer 14 must recognize the printing environment. The user feels that the printing speed of the printer 14 is degraded.

In the case that the plurality of pages of the data are continuously printed, the printing speed of the printer 14 almost is not degraded as the printer 14 prints the data using the recognized environment. As the document becomes larger and larger, the printer engine 25 occasionally stops the printing of the document data when printing the plurality of pages of the data a page by page. Moreover, the printer engine 25 may stop the printing of the document data because of having a small buffer. Therefore, the printing speed of the printer 14 is substantially degraded when the continuous printing of the data is required.

According to the present invention, a time required for transferring data to be printed is calculated by using characteristics of a printing operation. When a user performs a printing of data using an application program, a driver 12 in a host computer 10 converts the data to be printed into an command which the printer 14 can interpret, and transfers the command to the printer 14. The driver 12 recognizes a size of entire commands corresponding to a page of data to be printed. Further, the host computer 10 selects an input/output device 13, which in turn transfers the data converted by the driver 12 to the printer 14.

As a transfer speed for transferring the data to the printer is known and the driver 12 recognizes the size of a page of the commands, the time required for transferring a page of the data to the printer 14 can be calculated by dividing a page of the data by the data transfer speed. That is, the time required for transferring a page of the data to the printer 14 is calculated by using a following formula 1.

The transfer time=the size of a page of the data/the transfer speed    Formula 1.

Figure 3:
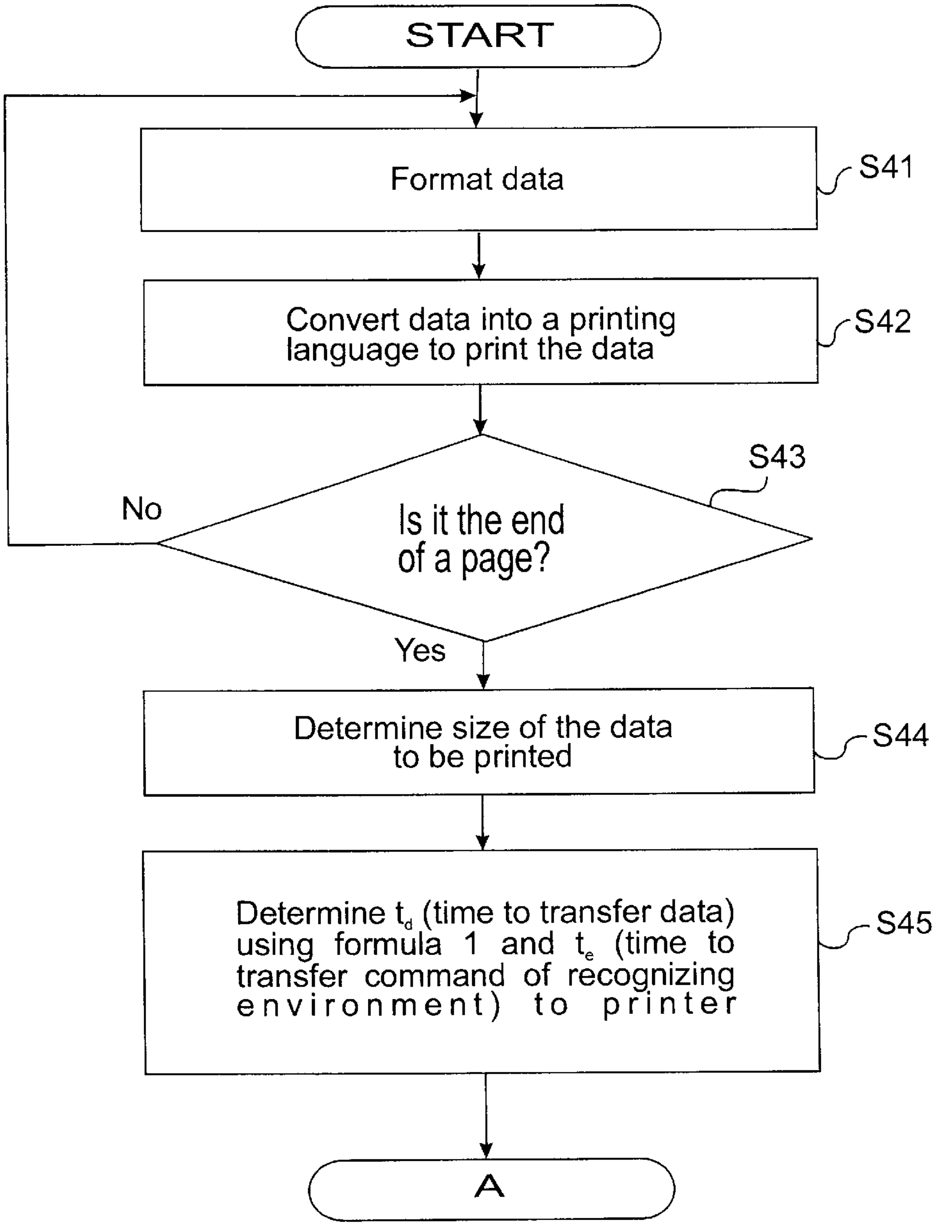
FIG. 3 is a flow chart showing a process of processing the data to be printed by means of a driver in a host computer according to the present invention; and It

Hereinafter, a processing of the data to be printed by means of the driver in the host computer and a pre-printing of the data to be printed in the printer according to the present invention will be described in detail with reference to FIGS. 3 and 4.

It is performed to format the data to be printed, at a step S41, and to convert the data into the language which the printer 14 can interpret, at a step S42.

The converting of the data to be printed into the print language is repeatedly performed by means of the driver 12 until a page of the data are converted into the print language, at a step S43.

If the converting of a page of the data into the print language is completed, it is performed to determine a size of the converted data so as to transfer the converted data to the printer 14, at a step S44.

After the size of the converted data is determined, the transfer time $t_d$ is calculated by using the above-mentioned formula 1, and a time $t_e$ for transferring the command of recognizing the environment of the printer engine is determined, at a step S45. That is, when the required time $t_d$ for transferring the data to the printer is as much as the time $t_e$ for transferring the command of recognizing the environment of the printer engine, the command of recognizing the environment of the printer engine may be transferred to the printer. Transferring the command of recognizing the environment of the printer engine is performed at the time at which the time $t_d$ for transferring the remaining data to the printer is the same as the time $t_e$ required for transferring command of recognizing the environment of the printer engine.

After the time $t_e$ for transferring the command of recognizing the environment has expired, the driver 12 transfers the data to the printer 14 at step S47 unless it is the time $t_e$ for transferring the command of recognizing the environment of the printer engine.

If it reaches the time $t_e$ for transferring the command of recognizing the environment of the printer engine during the transferring of the data to the printer 14, the driver 12 transfers the command for starting to recognize the environment of the printer engine, at a step S48.

Figure 4:
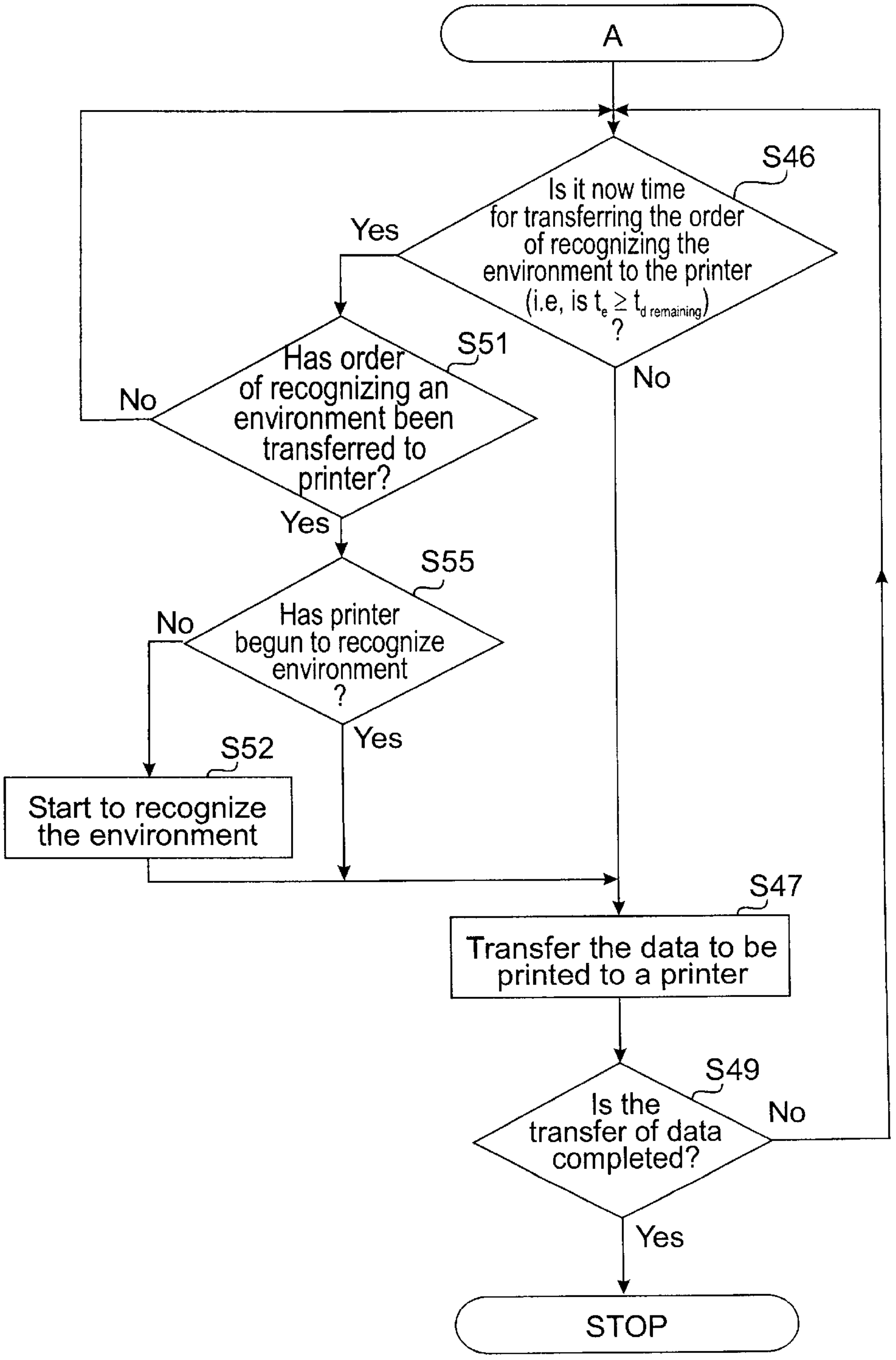
FIG. 4 is a flow chart showing a process of pre-printing data to be printed in a printer according to the present invention.

On the other hand, the printer 14 according to the present invention performs the pre-printing of the data as shown in FIG. 4. The printer 14 determines whether the command of recognizing the environment of the printer engine is transferred from the host computer 10, at a step S51.

If it is determined that the command of recognizing the environment of the printer engine is transferred from the host computer, it is started to recognize the environment of the printer engine, at a step S52. That is, the driver 12 makes it possible to recognize the printing environment of the printer engine.

If it is determined that the command of recognizing the environment of the printer engine is not transferred from the host computer, the printer 14 continues to receive the data to be printed from the host computer and performs a rendering, at a step S53.

The aforementioned steps are repeatedly performed unless a page of the data are printed, at a step S54.

In the method for improving the printing speed of the printer 14 according to the present invention, as described above, in order to overcome the time delay of the printing resulting from starting the recognizing of the environment of the printer engine after the printing signal is transferred, the host computer already calculates the transfer speed of the data and transfers the command of recognizing the environment of the printer engine to the printer so as to recognize the environment of the printer engine, thereby preventing the time delay of the printing.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A method for improving a printing speed of a printer comprising the steps of:

converting data to be printed by a predetermined size;

calculating a time required for transferring the converted data to the printer by means of a predetermined calculating formula;

setting a starting time for transferring a command of recognizing an environment of a printer engine to the printer with reference to the calculated time;

transferring the command of recognizing the environment of the printer engine to the printer at the starting time during a transferring of the converted data; and performing the recognizing of the environment of the printer engine after receiving the command of recognizing the environment.

2. A method for improving a printing speed of a printer as claimed in claim 1, wherein the time required for transferring the converted data is calculated as follows:

the transfer time=a size of a page of data/a transfer speed.

3. A method for improving a printing speed of a printer as claimed in claim 1, wherein the data to be printed are converted by a page.

4. A method for improving printing speed of a printer, comprising the steps of:

setting a starling time for transferring a command of recognizing an environment of a printer engine to the printer with reference to a calculated time;

transferring the command of recognizing the environment of the printer engine to the printer at the starting time during a transferring of the converted data; and performing the recognizing of the environment of the printer engine after receiving the command of recognizing the environment.

5. The method of claim 4, wherein said print environment recognition operation includes a sensing of temperature and humidity.

6. The method of claim 4, further comprising the step of calculating a time required for transferring the converted data to the printer by means of a predetermined calculating formula.

7. The method of claim 4, wherein the time required for transferring the converted data is calculated as follows:

the transfer time=a size of a page of data/a transfer speed.

8. The method of claim 1, wherein the data to be printed are converted by a page.

9. The method of claim 1, said transferring of said command of recognizing an environment of the printer engine is automatically executed for every print job.

10. The method of claim 4, said transferring of said command of recognizing an environment of the printer engine is automatically executed for every print job.

11. The method of claim 1, said environment of the printer engine comprises the temperature of the printer engine.

12. The method of claim 1, said environment of the printer engine comprises the humidity of the printer engine.

13. The method of claim 4, said environment of the printer engine comprises the humidity of the printer engine.

14. A method for printing paper from a printer attached to a computer, the method comprising the steps of:

setting a starting time for transferring a command of recognizing an environment of a printer engine to the printer based on a calculated time;

automatically transferring the command of recognizing the environment of the printer engine to the printer for each and every print job at the starting time while print image data is being transferred to the printer; and automatically performing the recognizing of the environment of the printer engine for each and every print job after receiving the command of recognizing the environment.

15. The method of claim 14, said environment of the printer comprising a temperature of the engine of the printer.

16. The method of claim 14, said environment of the printer comprising a humidity of the engine of the printer.

17. The method of claim 14, said transferring of said commend of recognizing the environment of the printer engine to the printer occurs prior to when said printer has finished receiving and formatting said print image data.

18. The method of claim 14, said recognizing the environment of the printer engine occurs prior to when said printer has finished receiving and formatting said print image data.

* * * * *